(12) United States Patent
Lambert et al.

(10) Patent No.: US 12,013,795 B1
(45) Date of Patent: Jun. 18, 2024

(54) SYSTEM AND METHOD FOR MANAGING PORTS OF DATA PROCESSING SYSTEMS AND ATTACHED DEVICES

(71) Applicant: Dell Products L.P., Round Rock, TX (US)

(72) Inventors: Timothy M. Lambert, Austin, TX (US); Jeffrey Leighton Kennedy, Austin, TX (US); Michael J. Stumpf, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/159,914

(22) Filed: Jan. 26, 2023

(51) Int. Cl.
*G06F 9/50* (2006.01)
*G06F 13/10* (2006.01)

(52) U.S. Cl.
CPC .......... *G06F 13/102* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 7,308,705 B2 | 12/2007 | Gordy et al. | |
| 7,676,571 B2 * | 3/2010 | LeMay | H04L 41/12 709/200 |
| 7,970,279 B2 | 6/2011 | Dress | |
| 8,615,611 B2 * | 12/2013 | Hall | G06F 13/385 710/72 |
| 9,331,899 B2 | 5/2016 | Christopher et al. | |
| 9,684,575 B2 | 6/2017 | Breakstone et al. | |
| 9,798,689 B2 * | 10/2017 | Hundal | G06F 13/385 |
| 10,019,388 B2 * | 7/2018 | Long | G06F 13/4282 |
| 10,261,561 B2 | 4/2019 | Chuang et al. | |
| 10,733,116 B2 | 8/2020 | Litichever et al. | |
| 11,029,742 B2 | 6/2021 | Webel et al. | |
| 11,112,846 B2 | 9/2021 | Strach et al. | |
| 11,226,919 B1 * | 1/2022 | Austin | G06F 9/4401 |
| 2008/0126629 A1 | 5/2008 | Huang | |
| 2009/0300329 A1 | 12/2009 | Naffziger et al. | |
| 2017/0147052 A1 | 5/2017 | Waters et al. | |
| 2017/0229094 A1 * | 8/2017 | Takahashi | G09G 5/006 |
| 2022/0130432 A1 | 4/2022 | Jayapal et al. | |
| 2023/0116669 A1 * | 4/2023 | Sunayama | G06F 11/221 714/30 |

OTHER PUBLICATIONS

"DC-MHS R1 Overview," 2022 OCP Global Summit (56 Pages).
(Continued)

*Primary Examiner* — Elias Mamo
(74) *Attorney, Agent, or Firm* — Womble Bond Dickinson (US) LLP

(57) ABSTRACT

Methods and systems for managing operation of data processing systems are disclosed. To manage the operation of the data processing systems, the data processing systems may include a port and configurable connection topology. The configurable connection topology may facilitate selective operable connection of the port to various portions of the data processing system such as management controllers and processing complex. By selectively connecting the port to various portions of the data processing system, devices connected to the ports may be managed for threat screening, reprovisioning, malfunction detection, and/or other purposes.

20 Claims, 9 Drawing Sheets

(56) References Cited

OTHER PUBLICATIONS

Kennedy, Jeff et al., "Peripheral Sideband Tunneling Interface (M-PESTI)," Datacenter-Modular Hardware Systems (DC-MHS) Rev 1.0, Apr. 27, 2022 (50 Pages).

"Why won't the computer wake up when connected over USB," Belkin Official Support, Web Page <https://www.belkin.com/support-article/?articleNum=8130>, accessed on Oct. 17, 2022 (2 Pages).

"Clock Gating for Power Reduction," CoQube Analytics and Services, 2021, Web Page <https://coqube.com/clock-gating-for-power-reduction/>, accessed on Oct. 17, 2022 (12 Pages).

Kennedy, Patrick, "Liquid Cooling Next-Gen Servers Getting Hands-on with 3 Options, " ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

\* cited by examiner

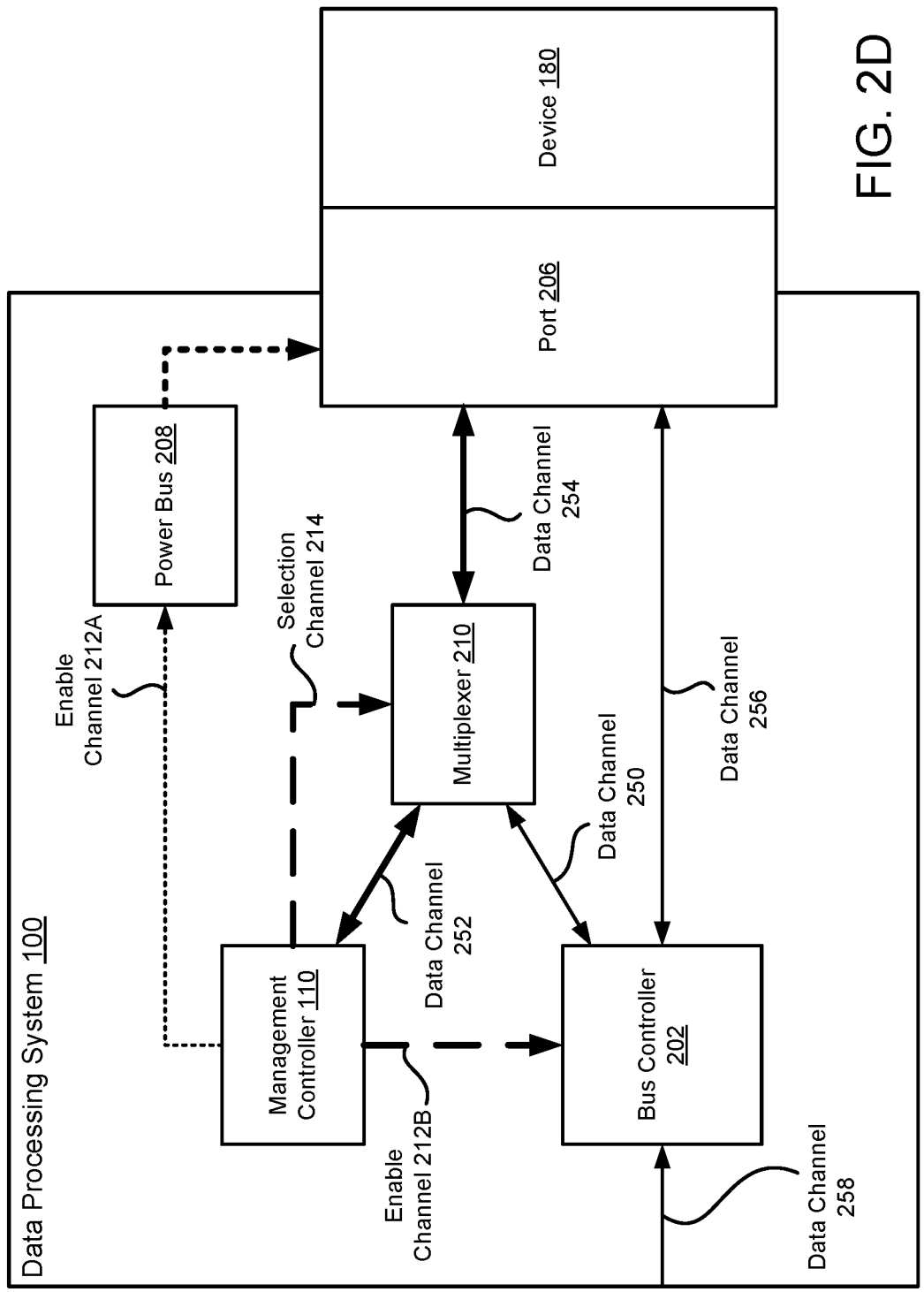

SYSTEM AND METHOD FOR MANAGING PORTS OF DATA PROCESSING SYSTEMS AND ATTACHED DEVICES

FIELD

Embodiments disclosed herein relate generally to device management. More particularly, embodiments disclosed herein relate to systems and methods to manage connection of devices to data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2F show diagrams illustrating connectivity of a system in accordance with an embodiment.

DETAILED DESCRIPTION

Figure 1:
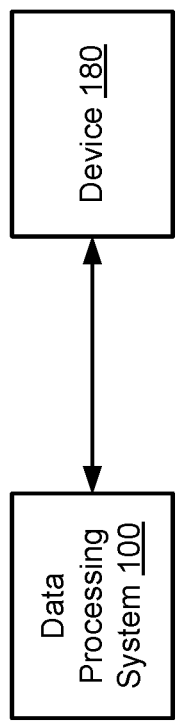
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems and systems. To manage the operation of a data processing system, a management controller and configurable communication topology may be used to manage attachment of devices to the data processing system. Attachment of the device may be managed by selectively facilitating attachment of the device to the management controller or to a processing complex of the data processing system.

By selectively attaching the device to the management controller, the management controller may (i) screen the device for threats to the processing complex, (ii) screen malfunctioning devices from the processing complex, and (iii) obtain data structures usable to manage the data processing system such as firmware images, configuration settings, etc.

By doing so, a data processing system in accordance with an embodiment may be more likely to be able to provide desired computer implemented services through increased availability of data to the management controller usable to update operation of the data processing system. Similarly, by screening threats and/or malfunctioning devices from attachment to processing complexes, the threats or malfunctioning devices may be less likely to interrupt the operation of the processing complex. Thus, embodiments disclosed herein may address, among others, the technical challenge of device management in distributed systems where threats to continued operation of a data processing may be presented by other devices.

In an embodiment, a method for managing operation of a data processing system is provided. The method may include identifying an occurrence of attachment of a device to a port of the data processing system; making a first determination regarding whether a training for a first connection between a processing complex of the data processing system and the device has failed; in an instance of the determination where the training has failed: performing, by a management controller of the data processing system, a screening of the device; making a second determination regarding whether the screening indicates that the device should be presented to the processing complex; in a first instance of the second determination where the screening indicates that the device should be presented to the processing complex: reversibly reallocating use of a second connection between the management controller and the device to the processing complex to initiate presentation of the device to the processing complex; and in a second instance of the second determination where the screening does not indicate that the device should be presented to the processing complex: performing an action set to notify a user of the data processing system that the device is not accessible.

Reversibly reallocating use of the second connection may include modifying a configuration a multiplexer operably connected by: a second connection to the port; a third connection to the management controller; and a fourth connection to the processing complex.

Making the second determination may include device link training (e.g., training circuitry that facilitate communications over a connection) at least one of the second connection and the third connection to establish an operable connection between the management controller and the device; and using a data structure available on the device to make the second determination.

Performing the action set may include obtaining a data structure from the device; and reversibly reallocating use of the second connection to the processing complex.

The method may also include, prior to making the first determination, disabling a switch (e.g., a bus such as bus controller 202) positioned between the port and the processing complex to cut off communication between the device and the processing complex.

Performing an action set to notify the user of the data processing system that the device is not accessible may include operably connecting to the device using the reversibly reallocated use of the second connection; obtaining a data structure from the device usable for data processing system management purposes; and initiating display of a message to the user indicating that the device is not accessible.

The switch may be disabled by initiating depowering of the switch by the management controller.

The port is a universal serial bus port, and the second connection may be positioned between a multiplexer used to reallocate the second connection and the port.

The method may also include making an identification that the data processing system has entered a secure mode of operation (e.g., by disabling bus controller 202 thereby allowing management controller 110 to screen devices connected to portions); based on the identification: disabling a switch positioned with the first connection to disable a first communication path between the processing complex and the port; and reversibly reallocating use of a second to the management controller to disable a second communication path between the processing complex and the port.

The method may also include, while the first communication path and the second communication path are disabled, screening devices when attached to the port; and selectively enabling, by the management controller, the first communication path or the second communication path for a subset of the devices.

In an embodiment, a non-transitory media is provided. The non-transitory media may include instructions that when executed by a processor cause the computer implemented method to be performed.

In an embodiment, a data processing system is provided. The data processing system may include the non-transitory media, a processing complex, and a management controller, and may perform the computer implemented method when the computer instructions are executed by the management controller.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 100. Data processing system 100 may provide the computer implemented services to users of data processing system 100 and/or to other devices (not shown).

To provide the computer implemented services, data processing system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

When providing the computer implemented services, information from a variety of sources may be used. For example, the information may be obtained from local store or from other devices, such as device 180.

To obtain information from device 180, data processing system 100 may operably connect to device 180. To operably connect, data processing system 100 may include ports to which receptacles or other attachment elements of device 180 may attach. Once attached, an operable connection may be established between data processing system 100 and device 180.

In general, embodiments disclosed herein may provide methods, systems, and/or devices for providing flexibility in obtaining information usable by various portions of data processing system 100 and/or securing data processing systems against devices that may be operably connected to it.

To provide for flexibility in obtaining and using information, data processing system 100 may include a configurable connection topology. The configurable connection topology may facilitate reconfiguration of connections between sources of data such as device 180 and consumers of the data such as processing complexes (e.g., processors/memory devices) and management controllers of data processing system 100. By doing so, management entities such as a management controller of data processing system 100 may be to acquire data (e.g., software images usable to flash hardware components, configuration settings, etc.) usable to update the operation of data processing system 100.

Additionally, to provide for flexibility with respect to the power states of the consumers of the data, at least some data consumers may include independent functionality to power the configurable connection topology independently. Thus, the configurable connection topology may remain powered while some consumer of the data are powered and other consumers of the data are unpowered. For example, a management controller hosted by data processing system 100 may remain active while processing complexes are inactive. Consequently, the management controller may still be able to obtain data usable to manage data processing system 100 while the processing complexes are unpowered.

To improve securing of data processing system 100, the configurable connection topology may shield sensitive portions of data processing system 100 from sources of data until the sources of the data are validated or otherwise identified as not being malicious. Once identified as not being malicious, operable connections being the sensitive portions and the sources of the data to provide the sensitive portions with access to data. Refer to FIGS. 2A-2F for additional details regarding configurable connection topologies.

Using the above noted functionality, data processing system 100 may (i) selectively provide management controllers with information usable to manage other components of the data processing system and (ii) shield processing complexes or other sensitive components of data processing system 100 from sources of data (e.g., device 180) until the sources of data are validated. By doing so, data processing system 100 may be more likely to be able to provide desired computer implemented services (e.g., by improving the likelihood that management entities have access to data) and reduce risk in exposing data processing system 100 to sources of desired data.

Processing complexes of data processing system 100 may host software (e.g., operating systems, applications) that provide the computer implemented services offered by data processing system 100. Processing complexes may be implemented using, for example, processors, memory modules, and/or other types of devices for processing data. In contrast, management controllers of data processing system 100 may manage the operation of data processing systems by, for example, validating code corresponding to the software prior to execution, managing firmware hosted by hardware components of the processing complexes or other portions of data processing system 100, and/or performing other types of management functionalities.

A management may be hosted by data processing system 100 (or may be separate), and may be implemented using an independent computing device such as an out-of-band or in-band management component. For example, management controller 110 may be implemented using an embedded computing device that operates independently from the other components of data processing system 100.

Management controller 110 may include functionality to (i) monitor operation of data processing system 100, (ii) manage operation of configurable connection topologies of data processing system 100, (iii) take over control of various ports of data processing system 100 using the flexible management topologies, (iv) providing screening services for devices connected to the ports (e.g., to validate whether the devices are trustworthy), and/or (v) use taken over ports to obtain data structures usable to manage the operation of data processing system 100. Refer to FIGS. 2A-2F for additional details regarding taking over control of ports of data processing system 100.

Figure 3:
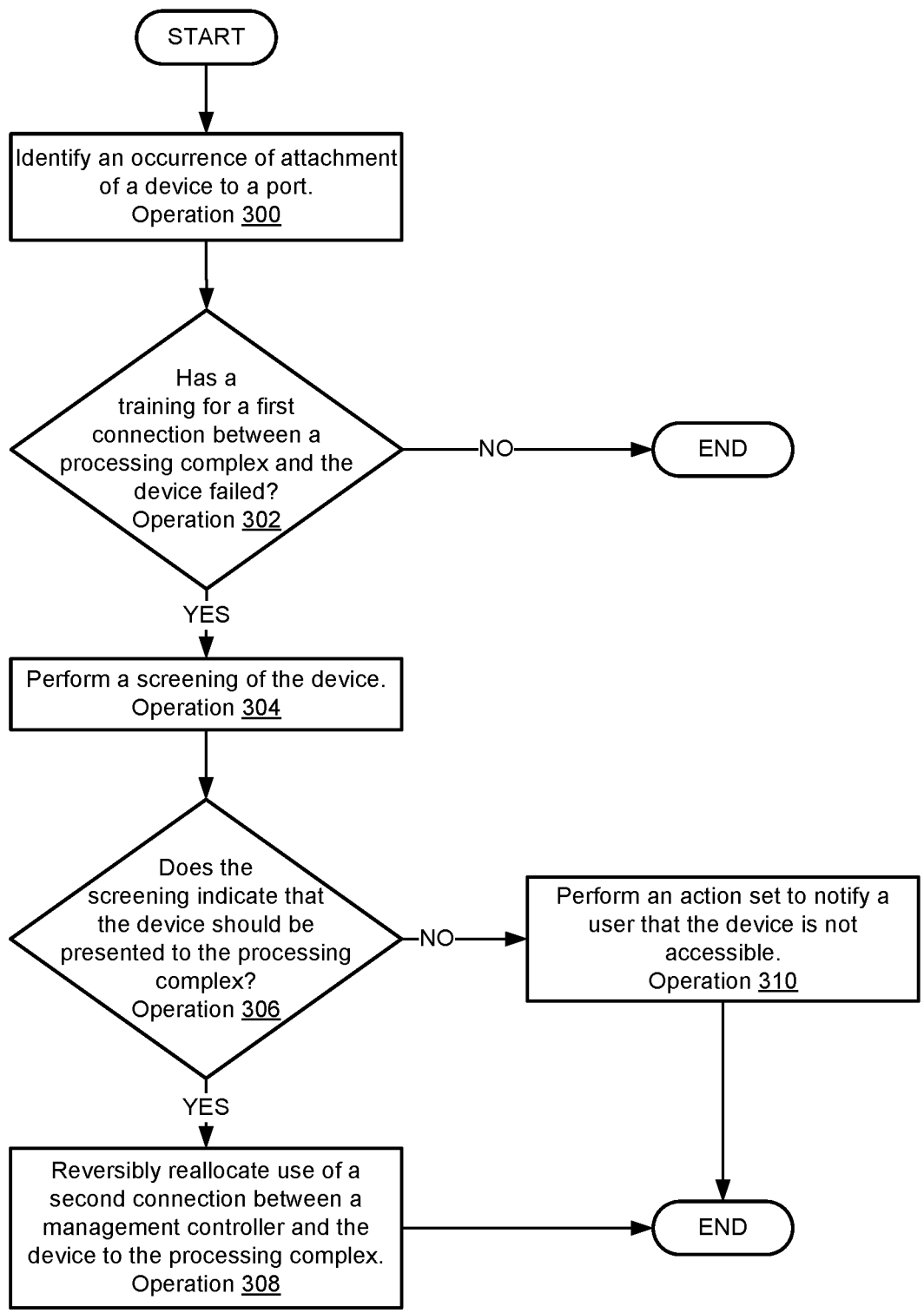
FIG. 3 shows a flow diagram illustrating a method of managing the operation of data processing systems in accordance with an embodiment.

When providing its functionality, data processing system 100 and/or components thereof may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Device 180 may be implemented using devices that may be operably connected to data processing system 100 using a port. For example, device 180 may be implemented with a universal serial bus compatible mass storage device, or other type of universal serial bus compatible device (e.g., such as network devices).

While illustrated in FIG. 1 as included a limited number of specific components, a system in accordance with an embodiment may include fewer, additional, and/or different components than those illustrated therein.

To further clarify embodiments disclosed herein, diagrams illustrating configurable connection topologies in accordance with an embodiment are shown in FIGS. 2A-2F.

Figure 2A:
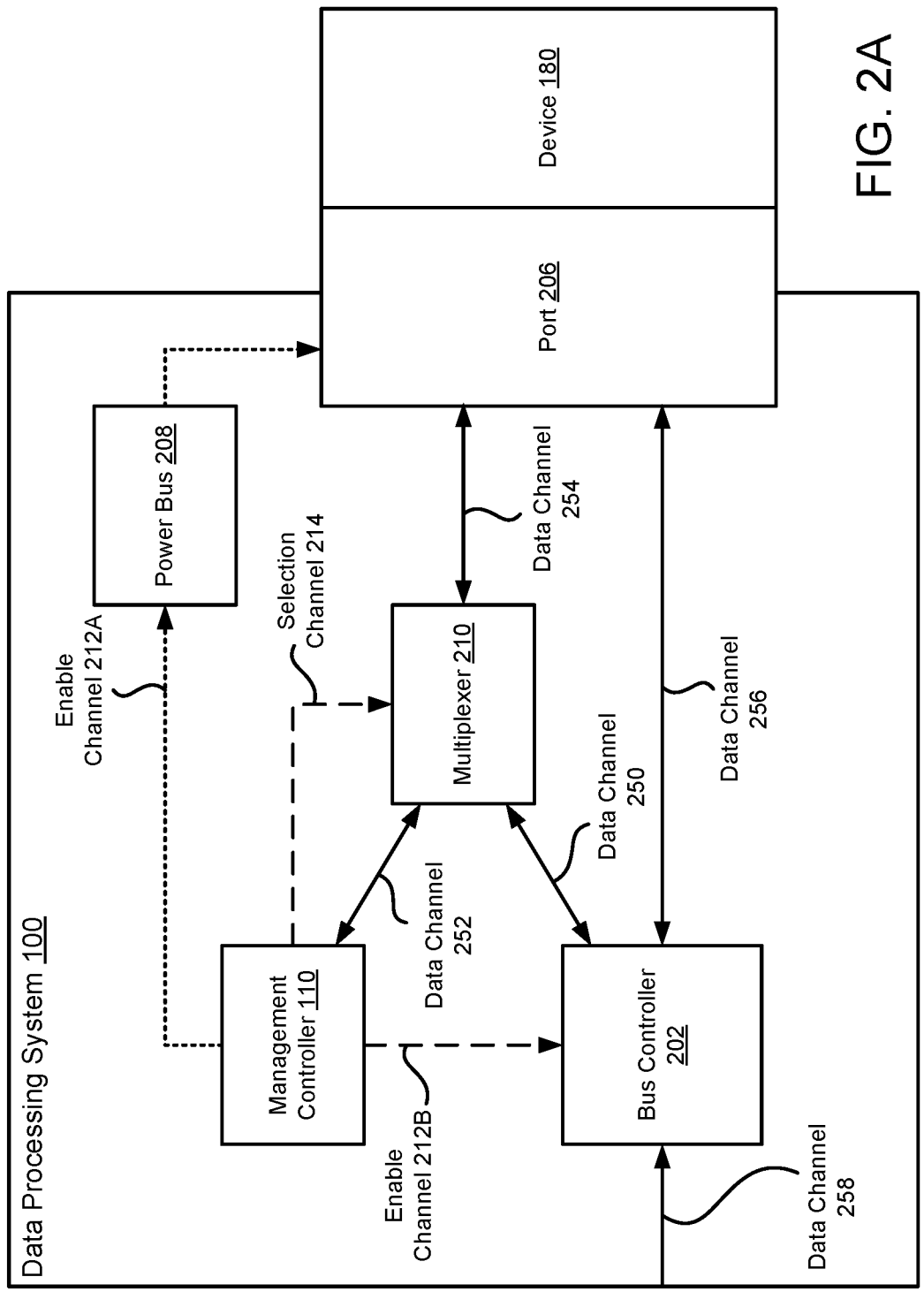

Turning to FIG. 2A, a diagram showing a first configurable connection topology in accordance with an embodiment is shown. To facilitate communications between device 180 and various portions of data processing system, data processing system 100 may include bus controller 202, multiplexer 210, and port 206. These components may support a set of communication channels usable to operably connect management controller 110 or bus controller 202 to devices connected to port 206. Each of these components is described below.

Bus controller 202 may be an interface controller (e.g., universal serial bus (USB) switch or other device) that obtains communications via one or more channels (e.g., 256, 250), and provides the communications to a processing complex or other components reachable via data channel 258. Bus controller 202 may be separate from or a part of a processing complex.

Port 206 may include one or more powered ports through which external devices may be operably connected to data processing system 100. For example, port 206 may include one more receptacles for connectors of the external devices that physically connect the external device (e.g., device 180) and port 206. Port 206 may also include, for example, powered chips and/or other elements for generating and/or managing electrical signals transmitted from the external devices via port 206. When an electrical signal is received by port 206, data from the signal may be transmitted to multiplexer 210 or bus controller 202. Similarly, when data from multiplexer 210 or bus controller 202 is obtained by port 206, port 206 may generate electrical signals to convey the data to a connected external device.

Port 206 may be powered by power bus 208. Power bus 208 may be managed by management controller 110, processing complexes (not shown), and/or other components of data processing system 100. For example, management controller 110 or a processing complex may instruct power bus 208 to provide power to port 206.

To instruct power bus 208 to power port 206, management controller 110 may be operably connected to an enable input (e.g., that controls whether power is output based on a high or low signal on the enable input) of power bus 208 via enable channel 212A. Consequently, management controller 110 may instruct power bus 208 to provide power to port 206 (e.g., using a high or low signal). Similar connections (not shown) may exist for processing complexes or other components of data processing system 100 thereby allowing the other components to also manage the power state of port 206. In FIG. 2A, channels supporting management and distribution of power are illustrated with short, dashed lines terminating in at least one arrow, and channels through which data is transmitted are illustrated using solid lines terminating in at least one arrow.

Multiplexer 210 may flexibly place processing complexes or management controller 110 in communication with port 206. For example, to facilitate takeover (e.g., exclusive use) of port 206 by management controller 110, the configuration of multiplexer 210 may be changed such that data channel 250 is rendered inoperable thereby disconnecting bus controller 202 from port 206 via one communication path (e.g., which includes data channel 250, data channel 254, and data channel 258) to port 206.

Similarly, to disable a second communication path (e.g., which includes data channel 256 and data channel 258) between a processing complex and port 206, management controller 110 may instruct bus controller 202 to suspend its operation, shut off, or otherwise stop providing its functionality. Management controller 110 may be operably connected to an enable input of bus controller 202 via enable channel 212B. Thus, management controller 110 may selectively disable bus controller 202 by providing appropriate signals to bus controller 202 via enable channel 212B.

When both communication paths are inoperable, the processing complexes may be disconnected from devices connected to port 206.

Figure 2B:
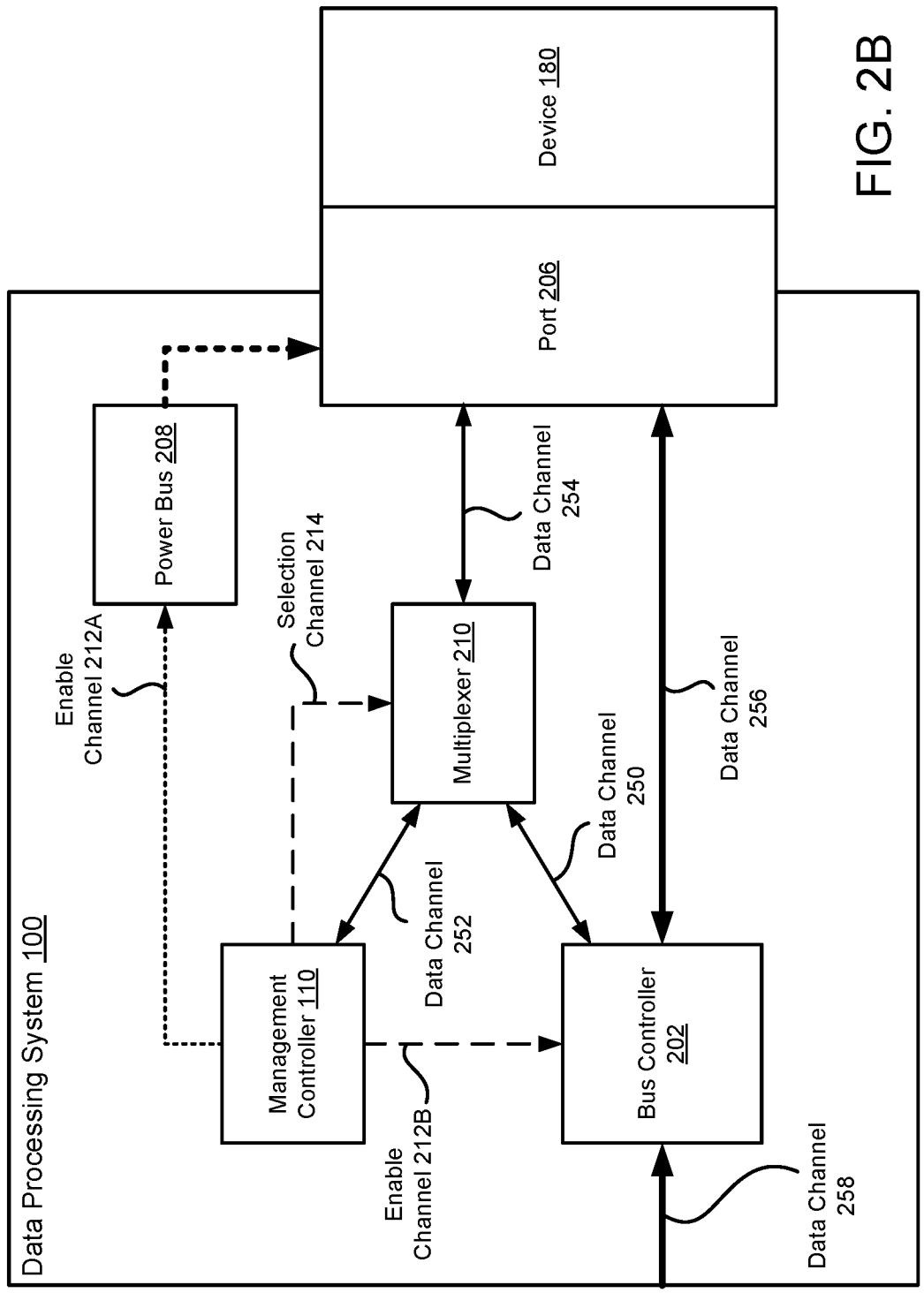
Figure 2C:
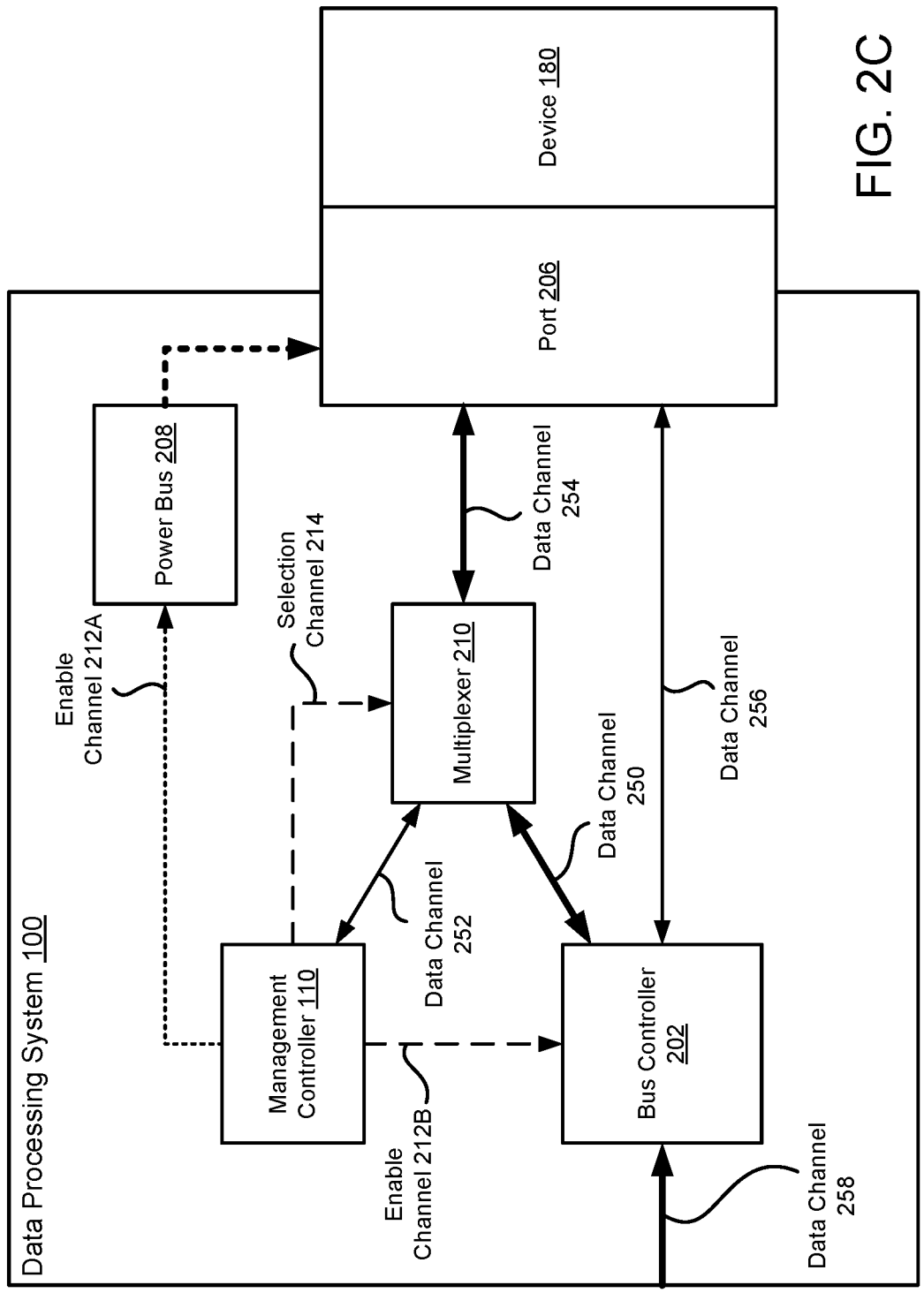

To operably connect management controller 110 to device 180 via port 206, the configuration of multiplexer 210 may be modified, as noted above, thereby placing management controller 110 in operable communication with port 206 via data channel 252 and data channel 254 (e.g., through signal/data multiplexing). In contrast, to operably connect bus controller 202 to port 206, multiplexer may perform signal/data multiplexing with respect to data channel 250 rather than data channel 252. Refer to FIGS. 2B-2C for additional details regarding the operable communication channels depending on the configuration of multiplexer 210.

Multiplexer 210 may, therefore, selectively reallocate use of data channel 254 (e.g., a shared channel) to management controller 110 or bus controller 202. For example, multiplexer 210 may reallocate the shared channel to management controller 110 so that management controller 110 may access data stored in device 180, may screen access device 180 prior to connecting with processing complexes, and/or to provide other functionalities.

The configuration of multiplexer 210 may be set using a selection input. The selection input may modify the configuration of multiplexer 210 based on a signal received at the selection input. To facilitate takeover of port 206, management controller 110 may be operably connected to the selection input via selection channel 214 (illustrated in FIG. 2A using long dashing). Using selection channel 214, management controller 110 may modify the configuration of multiplexer 210 thereby flexibly modifying the communication topology of data processing system 100.

Any of the channels (e.g., 212A, 212B, 214, 250, 252, 254, 256, 258) may be implemented using, for example, sets of electrical conductors (e.g., circuit card traces, cabling, etc.) that facilitate transmission of electrical signals. To carry signals over these channels, any of the devices connected to end points of the electrical conductors may include circuitry to send/receive electrical signals via the electrical conductors. To establish operable connections, these circuits may need to perform training processes prior to data transmission. The training processes may, for example, characterize the electrical conductors thereby allowing the circuits to establish protocol compliant voltage levels, time signals, etc.

Different sets of electrical conductors and circuitry corresponding to the sets of conductors may support different communication protocols. For example, in the context of universal serial bus (USB) communications, the channels may support different versions of standards. These versions of the standards may support higher or lower communication rates, and/or other functionalities (e.g., power distribution).

For example, data channel 256 may support be able to support USB 3.0 communications while other data channels (e.g., 250, 252, 54) may only support USB 2.0 communications. When device 180 is operably connected to data processing system 100, device 180 may be operably connected to the two different communication paths, discussed above. Consequently, if one of the communication paths is inoperable (e.g., when bus controller 202 is disabled) or fails to carry communications for other reasons (e.g., training fails due to, for example, improper operation of device 180 or circuitry corresponding to the channels), the other communication path may be used to facilitate communications. Management controller 110 may monitor the states of these communications paths (e.g., by identifying when circuitry of bus controller 202 or itself) obtaining information regarding attempts to perform training ahead of communications on these paths and the outcomes of the training (e.g., successful or unsuccessful).

Port 206 may be implemented, as noted above, using a receptacle. Devices such as device 180 may include a corresponding plug that allows for operable connections between port 206 and the devices to be establish through insertion of the plug into the receptacle. For example, port 206 may be implemented using a universal serial bus receptacle, of any form factor.

When connected to port 206, power may be provided to device 180 in addition to data transmitted via port 206.

Turning to FIG. 2B, a diagram showing a second configurable connection topology in accordance with an embodiment is shown. The second configurable connection topology shown in FIG. 2B may be identical to the topology shown in FIG. 2A. However, to clarify the channels that are active in a scenario in which management controller 110 has not taken over port 206 and in a scenario in which device 180 supports USB 3.0 communications, the thickness of the lines corresponding to these channels have been increased.

As seen in FIG. 2B, a processing complex may be operably connected to port 206 via a first path. The first path may include data channel 256 and data channel 258. In this configuration, the processing complex may have exclusive use of communication via port 206 (e.g., at least exclusive with respect to management controller 110, other hardware components served by bus controller 202 may also be able to communicate).

To enter this configuration, power bus 208 may power port 206 and multiplexer 210 bus controller 202 may be active. When device 180 is operably connected, presuming that device 180 is compatible with USB 3.0 communications, data channel 256 may train and facilitate communication. In this scenario shown in FIG. 2B, management controller has enabled bus controller 202 via enable channel 212B.

Turning to FIG. 2C, a diagram showing a third configurable connection topology in accordance with an embodiment is shown. The configurable communication topology shown in FIG. 2C may be identical to the topology shown in FIG. 2A. However, to clarify the channels that are active while management controller 110 has not taken over port 206 and in a scenario in which device 180 only supports USB 2.0 communications, the thickness of the lines corresponding to these channels has been increased.

As seen in FIG. 2C, bus controller 202 may be operably connected to port 206 via a second path. The second path may include data channel 250 and data channel 254. In this configuration, the processing complex connected to bus controller 202 may have exclusive use of communications via port 206 (e.g., at least exclusive with respect to management controller 110, other hardware components may also be served by bus controller 202).

To enter this configuration, power bus 208 may power port 206 and multiplexer 210 may multiplex signals/data from port 206 obtained via data channel 254 to bus controller 202 via data channel 250.

Turning to FIG. 2D, a diagram showing a fourth configurable connection topology in accordance with an embodiment is shown. The configurable communication topology shown in FIG. 2D may be identical to the topology shown in FIG. 2A. However, to clarify the channels that are active while management controller 110 has taken over port 206 and the processing complex is active, the thickness of the lines corresponding to these channels has been increased.

As seen in FIG. 2D, bus controller 202 may not be operably connected to port 206, but management controller 110 may be operably connected to port 206 via a third path. The third path may include data channel 252 and data channel 254. In this second configuration, management controller 110 may have exclusive use of communication via port 206.

To enter the second configuration, power bus 208 may power port 206 (e.g., based on instructions from the processing complex) and multiplexer 210 may multiplex signals/data from port 206 obtained via data channel 254 to management controller 110 via data channel 252 (e.g., rather than multiplexing to bus controller 202 via data channel 250). Additionally, management controller 110 may disable bus controller 202 via enable channel 212B thereby disabling both communication paths between bus controller 202 and port 206.

Figure 2E:
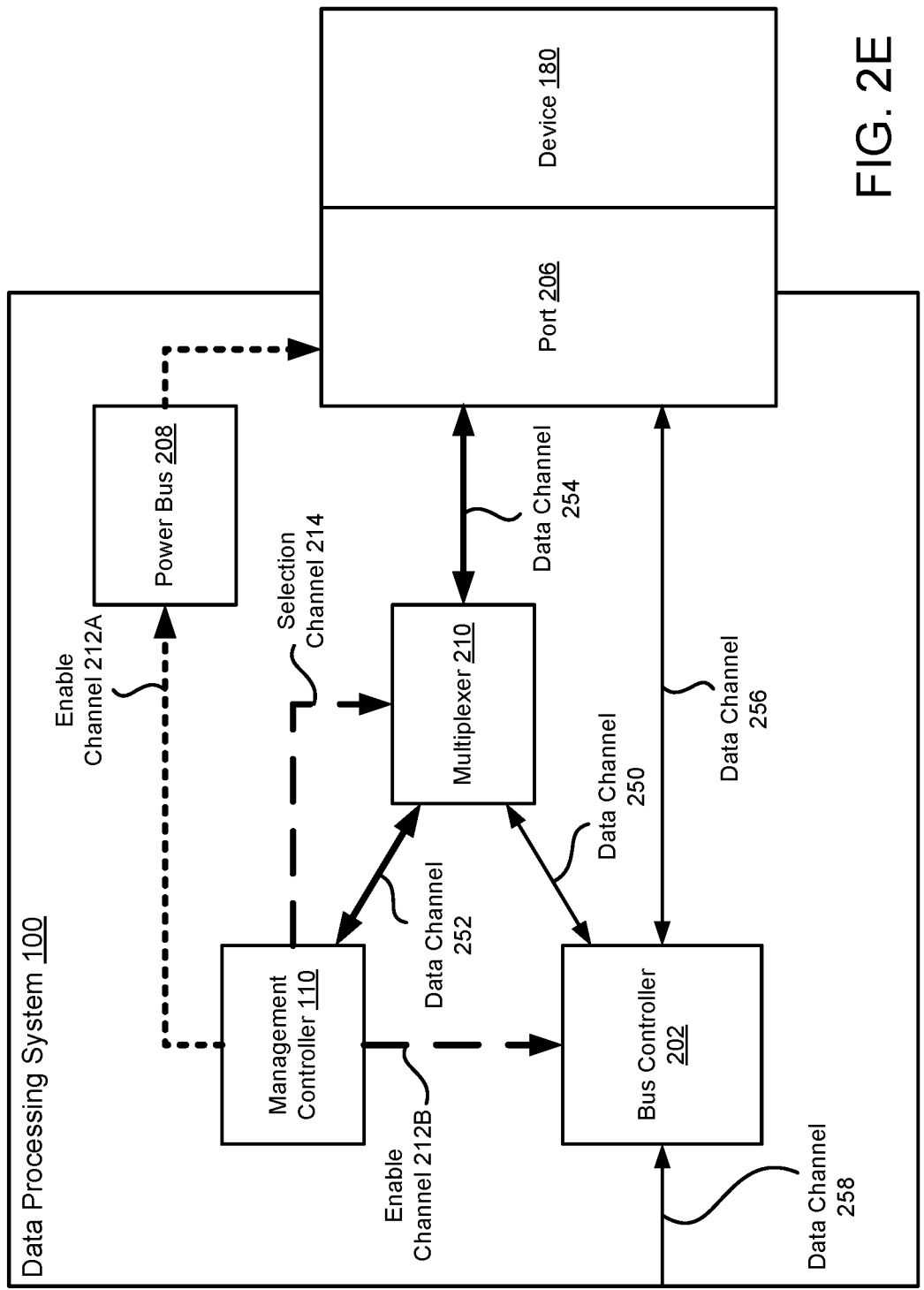

Turning to FIG. 2E, a diagram showing a fifth configurable connection topology in accordance with an embodiment is shown. The configurable communication topology shown in FIG. 2E may be identical to the topology shown in FIG. 2A. However, to clarify the channels that are active while management controller 110 has taken over port 206 and the processing complex is inactive, the thickness of the lines corresponding to these channels has been increased.

As seen in FIG. 2E, in contrast to FIG. 2D, management controller 110 may provide instructions to bus 208 via enable channel 212A to power port 206. Thus, regardless of the power state of the processing complex and/or other portions of data processing system 100, port 206 may be selectively powered by management controller 110. Consequently, management controller 110 may access device 180 via port 206 even when the processing complex is not operating (or may be operating in manners where it would not instruct power bus 208 to power port 206).

While illustrated in FIG. 2E with respect to an internal topology of data processing system 100, the configurable connection topology may be an external topology.

Figure 2F:
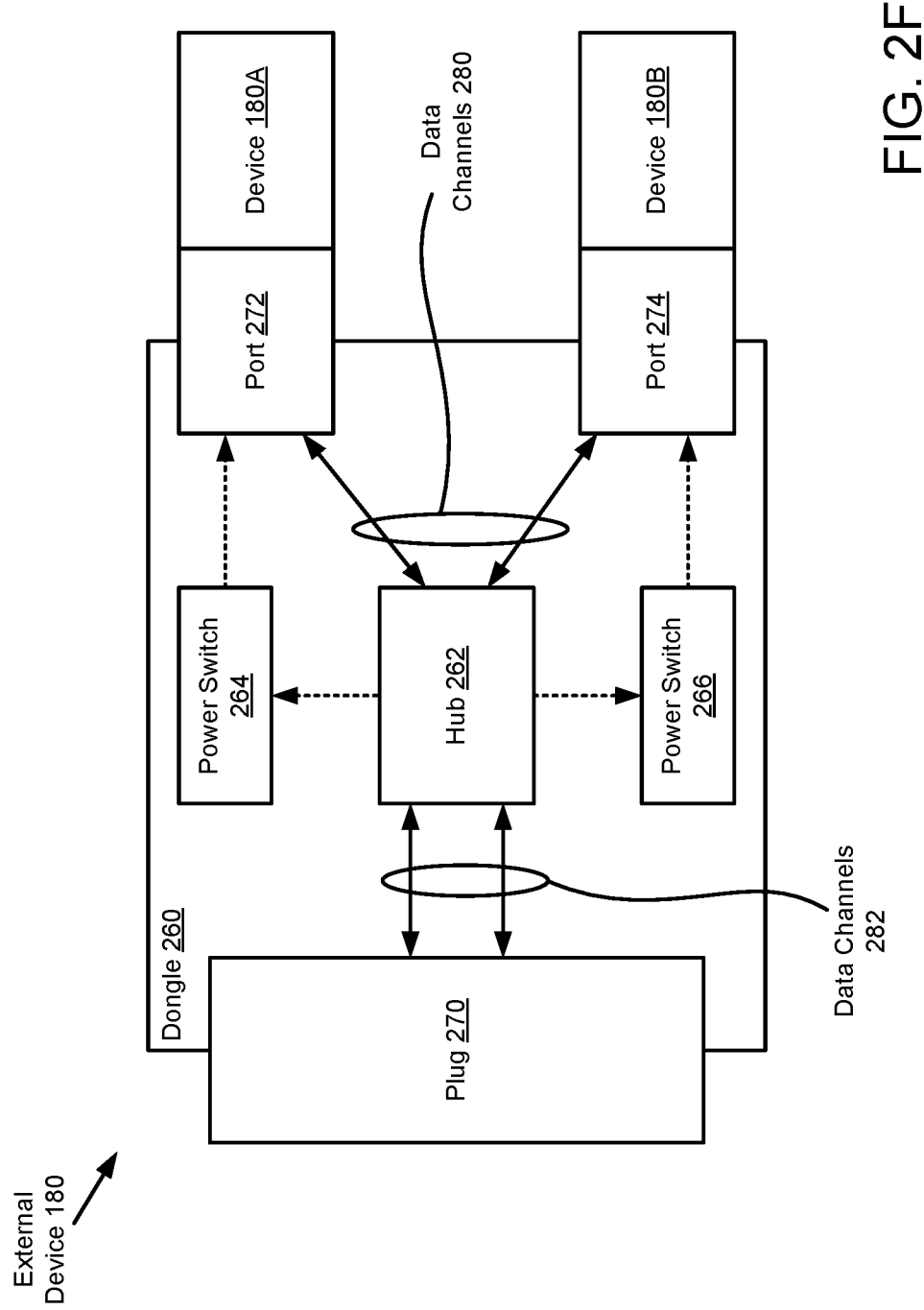

Turning to FIG. 2F, a diagram showing a sixth configurable connection topology in accordance with an embodiment is shown. The illustrated configurable connection topology may include dongle 260. Dongle 260 may be implemented using as a USB device connectable to a port of a data processing system via plug 270. When so connected, data channels 282 may operably connect plug 270 to hub 262. Hub 262 may be a configurable USB hub that may operably connect any number of ports (e.g., 272, 274) to plug 270.

Each of the ports (e.g., 272, 274) may be powered via one or more power switches (e.g., 264, 266). The power switches may selectively power the ports based on instructions received from a data processing system, management controller thereof, etc. For example, instructions may be related via data channels 282 and hub 262 to reach the power switches. Consequently, the ports of dongle 260 may selectively power devices (e.g., 180A, 180B) connected to them based on instructions received from a data processing system.

Accordingly, by selectively powering the ports, the corresponding devices may be selectively placed in operable connection with hub 262 via data channels 280.

Data channels 280 may be USB 3.0 communications compatible, while data channels 282 may be compatible with SUB 3.0 communications and USB 2.0 communications, respectively.

While the ports and connected devices have been illustrated in FIGS. 2A-2F as being external, the ports and connective devices may be internal without departing from embodiments disclosed herein.

In an embodiment, management controller 110 is implemented using a hardware device including circuitry. The hardware device may be, for example, a digital signal processor, a field programmable gate array, or an application specific integrated circuit. The circuitry may be adapted to cause the hardware device to perform the functionality of management controller 110 such as any of the processes discussed with respect to FIGS. 2A-3. Management controller 110 may be implemented using other types of hardware devices without departing embodiment disclosed herein.

In an embodiment, management controller 110 is implemented using a processor adapted to execute computing code stored on a persistent storage that when executed by the processor performs the functionality of management controller 110 discussed throughout this application such as the processes discussed with respect to FIGS. 2A-3. The processor may be a hardware processor including circuitry such as, for example, a central processing unit, a processing core, or a microcontroller. The processor may be other types of hardware devices for processing information without departing embodiment disclosed herein.

In an embodiment, management controller 110 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed with respect to FIGS. 2A-3. For example, the data structures may include security information (e.g., cryptographic signatures, keys, etc.) usable to validate connective devices and/or data structures stored therein. Any of these data structures may be implemented using, for example, lists, tables databases, linked lists, unstructured data, and/or other types of data structures.

As discussed above, the components of FIG. 1 may perform various methods to provide computer implemented services by completing startups (e.g., which may be required to be completed for the computer implemented services to be provided. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method managing an attachment of a device to a portion of a data processing system in accordance with an embodiment is shown. The method may be performed by data processing system 100, components thereof such as management controllers, configurable connectivity topologies or components thereof, or other components of the system shown in FIG. 1. For example, a management controller that operates independent from, manages the operation of, and/or is hosted by a data processing system may perform the method.

At operation 300, an occurrence of an attachment of a device to a port is identified. When attached, the port may be allocated to a processing complex but may be connected to a configurable connection topology. When allocated to the processing complex, the connectivity as illustrated in FIG. 2B and/or FIG. 2F may be present. The identification may be made by monitoring attempts to train channels through which the device is reachable. The training may or may not be successful.

At operation 302, a determination is made regarding whether a training for a first connection between a processing complex and the device has failed. The determination may be made, for example, based on the outcome of the monitoring performed in operation 300. If the training has failed, attempts to train a second communication channel may be automatically made in accordance with a USB hierarchy that defines an ordering of channels for training purposes. For example, the hierarchy may specify that 3.0 channels may be preferentially trained over 2.0 channels, unless training failures occur.

In an embodiment, a management controller may have disabled a bus controller in a communication path. For example, the connection topology shown in FIG. 2D may exist thereby allowing the management controller to screen all devices prior to being allowed to attach to a processing complex. Doing so may reduce the likelihood of data which may compromise the processing complex being introduced. In such scenarios, training for the path may be treated as having failed even if the training has never been attempted.

If it is determined that the training has failed, the method may proceed to operation 304. Otherwise, the method may end following operation 302. If the method ends, the successful training may allow the processing complex to attach the device thereby allowing for data to be transmitted between the processing complex and the device.

At operation 304, a screening of the device is performed. The screening may be performed by validating the device using security information, validating data structures stored in the device, and/or via other methods. The screening may be performed by (i) operably connecting the device to a management controller (e.g., by establishing the connectivity topology as illustrated in FIG. 2D and/or FIG. 2F), (ii) attaching the device to the management controller, and (iii) by communication with the attached device. The management controller may use security data to, for example, validate whether the device or data structure stored in it are to be trusted.

The screening may also include identifying relevancy of data stored in the device. For example, the data may be relevant to the management controller (e.g., such as firmware images, other software images, configuration settings, etc.) or to the processing complex (e.g., includes user files). The data may be compared to criteria used to discriminate whether the data is relevant to the management controller or the processing complex. The criteria may include any type and quantity of basis for comparison to identify the relevancy of the data.

The screening may also include identifying whether the device natively supports USB 3.0 or USB 2.0.

At operation 306, a determination is made regarding whether the screening indicates that the device should be presented to the processing complex. The determination may be made based on whether the device can be validated and/or the data stored in the device. For example, if the device/data stored in the device cannot be validated, then it may be determined that the device should not be presented to the processing complex. Likewise, if the data stored in the device can be validated, but is only relevant to the management controller, then it may be determined that the device should not be presented to the processing complex. However, if the data/device can be validated and the data is relevant, then it may be determined that the screening indicates that the device should be presented to the processing complex.

The determination may be made based on whether the device supports USB communication protocols associated with the different communication paths. For example, if a device only natively support the USB communication protocol associated with one of the paths but not the other, failing to train on the other path may not be viewed as potentially indicating that the device may be problematic. Thus, it may be determined that the screening indicates that the device should be presented to the processing complex if the device does not natively support the USB communication protocol associated with the communication path that failed training.

If it is determined that the screening indicates that the device should be presented to the processing complex, then the method may proceed to operation 308. Otherwise, the method may proceed to operation 310.

At operation 308, use of a second connection between a management controller and the device is reallocated to the processing complex. The second connection may be reallocated by establishing the connection topology illustrated in FIG. 2C and/or FIG. 2F. Once established, the device may attach to the processing complex.

The method may end following operation 308.

Returning to operation 306, the method may proceed to operation 310 following operation 306 when it is determined that the screening does not indicate that the device should be presented to the processing complex.

At operation 310, an action set is performed to notify a user that the device is not accessible. The action set may include, for example, displaying information to the user, setting flags, sending notifications, and/or other types of actions.

The action set may also include, for example, obtaining data stored on the device that is relevant to the management controller (e.g., copying firmware images or other data structures) for future use.

The action set may also include, for example, detaching the device from the management controller. The detachment may be performed via software, through depowering a port to which the device is connected, and/or via other methods.

The method may end following operation 310.

Using the method illustrated in FIG. 3, embodiments disclosed herein may facilitate flexible use of ports by different portions of a data processing system as well as improve security with respect to devices connected to ports of data processing systems.

Figure 4:
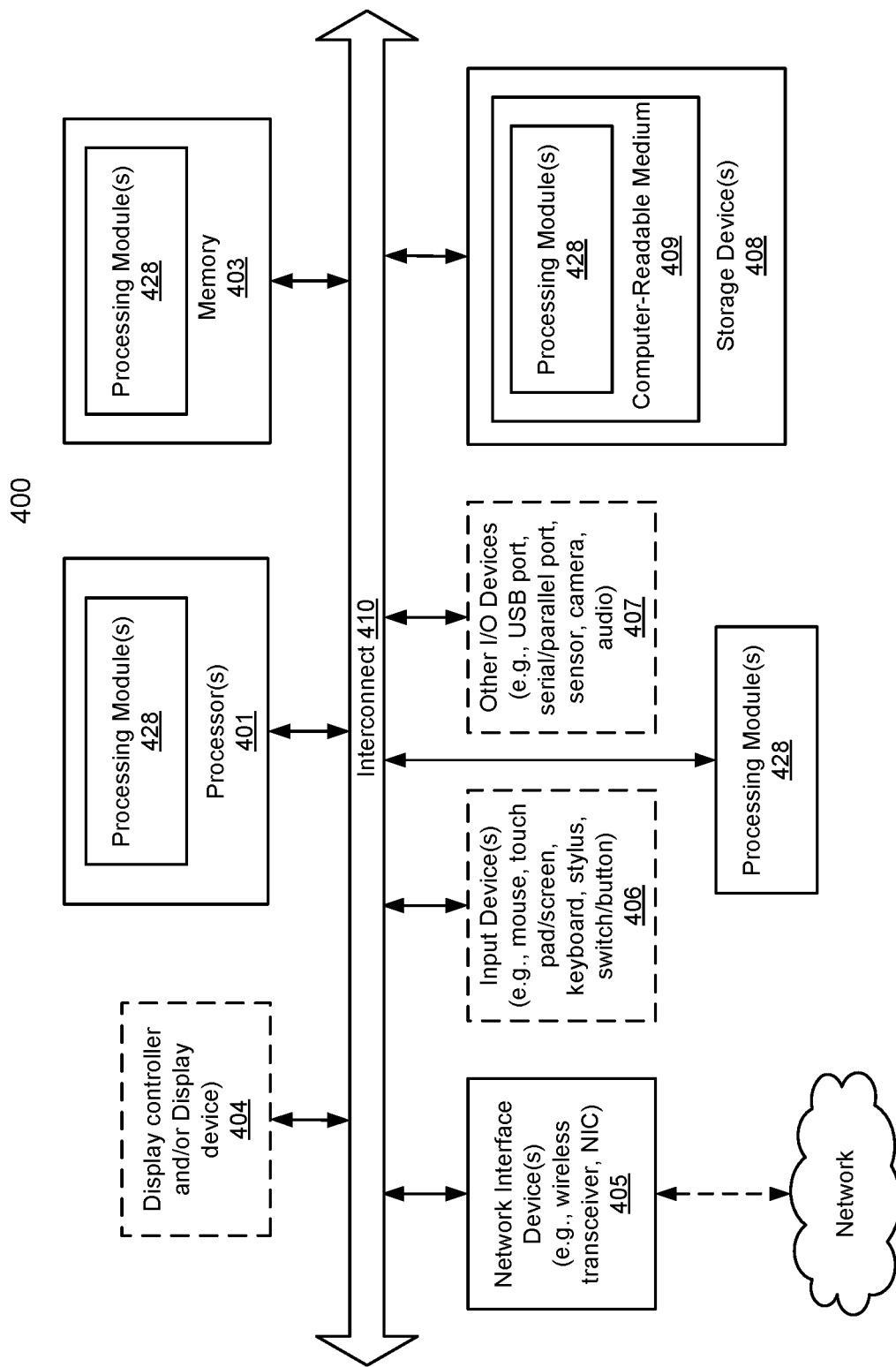
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
   identifying an occurrence of attachment of a device to a port of the data processing system;
   making a first determination regarding whether a training for a first connection between a processing complex of the data processing system and the device has failed;
   in an instance of the determination where the training has failed:
   performing, by a management controller of the data processing system, a screening of the device;
   making a second determination regarding whether the screening indicates that the device should be presented to the processing complex;
   in a first instance of the second determination where the screening indicates that the device should be presented to the processing complex:
   reversibly reallocating use of a second connection between the management controller and the device to the processing complex to initiate presentation of the device to the processing complex; and
   in a second instance of the second determination where the screening does not indicate that the device should be presented to the processing complex:

performing an action set to notify a user of the data processing system that the device is not accessible.

2. The method of claim 1, wherein reversibly reallocating use of the second connection comprises:
modifying a configuration a multiplexer operably connected by:
a second connection to the port;
a third connection to the management controller; and
a fourth connection to the processing complex.

3. The method of claim 2, wherein making the second determination comprises:
device link training at least one of the second connection and the third connection to establish an operable connection between the management controller and the device; and
using a data structure available on the device to make the second determination.

4. The method of claim 3, wherein performing the action set comprises:
obtaining a data structure from the device; and
reversibly reallocating use of the second connection to the processing complex.

5. The method of claim 1, further comprising:
prior to making the first determination, disabling a switch positioned between the port and the processing complex to cut off communication between the device and the processing complex.

6. The method of claim 5, wherein performing an action set to notify the user of the data processing system that the device is not accessible comprises:
operably connecting to the device using the reversibly reallocated use of the second connection;
obtaining a data structure from the device usable for data processing system management purposes; and
initiating display of a message to the user indicating that the device is not accessible.

7. The method of claim 5, wherein the switch is disabled by initiating depowering of the switch by the management controller.

8. The method of claim 1, wherein the port is a universal serial bus port, and the second connection is positioned between a multiplexer used to reallocate the second connection and the port.

9. The method of claim 1, further comprising:
making an identification that the data processing system has entered a secure mode of operation;
based on the identification:
disabling a switch positioned with the first connection to disable a first communication path between the processing complex and the port; and
reversibly reallocating use of a second to the management controller to disable a second communication path between the processing complex and the port.

10. The method of claim 9, further comprising:
while the first communication path and the second communication path are disabled, screening devices when attached to the port; and
selectively enabling, by the management controller, the first communication path or the second communication path for a subset of the devices.

11. A non-transitory machine-readable medium having instructions stored therein, which when executed by a processor, cause the processor to perform operations for managing operation of a data processing system, the operations comprising:
identifying an occurrence of attachment of a device to a port of the data processing system;
making a first determination regarding whether a training for a first connection between a processing complex of the data processing system and the device has failed;
in an instance of the determination where the training has failed:
performing, by a management controller of the data processing system, a screening of the device;
making a second determination regarding whether the screening indicates that the device should be presented to the processing complex;
in a first instance of the second determination where the screening indicates that the device should be presented to the processing complex:
reversibly reallocating use of a second connection between the management controller and the device to the processing complex to initiate presentation of the device to the processing complex; and
in a second instance of the second determination where the screening does not indicate that the device should be presented to the processing complex:
performing an action set to notify a user of the data processing system that the device is not accessible.

12. The non-transitory machine-readable medium of claim 11, wherein reversibly reallocating use of the second connection comprises:
modifying a configuration a multiplexer operably connected by:
a second connection to the port;
a third connection to the management controller; and
a fourth connection to the processing complex.

13. The non-transitory machine-readable medium of claim 12, wherein making the second determination comprises:
device link training at least one of the second connection and the third connection to establish an operable connection between the management controller and the device; and
using a data structure available on the device to make the second determination.

14. The non-transitory machine-readable medium of claim 13, wherein performing the action set comprises:
obtaining a data structure from the device; and
reversibly reallocating use of the second connection to the processing complex.

15. The non-transitory machine-readable medium of claim 11, wherein the operation further comprise:
prior to making the first determination, disabling a switch positioned between the port and the processing complex to cut off communication between the device and the processing complex.

16. A data processing system, comprising:
a processing complex;
a management controller comprising:
a processor;
a memory coupled to the processor to store instructions, which when executed by the processor, cause the processor to perform operation, the operations comprising:
identifying an occurrence of attachment of a device to a port of the data processing system;

making a first determination regarding whether a training for a first connection between a processing complex of the data processing system and the device has failed;

in an instance of the determination where the training has failed:

performing, by a management controller of the data processing system, a screening of the device;

making a second determination regarding whether the screening indicates that the device should be presented to the processing complex;

in a first instance of the second determination where the screening indicates that the device should be presented to the processing complex:

reversibly reallocating use of a second connection between the management controller and the device to the processing complex to initiate presentation of the device to the processing complex; and in a second instance of the second determination where the screening does not indicate that the device should be presented to the processing complex:

performing an action set to notify a user of the data processing system that the device is not accessible.

17. The data processing system of claim 16, wherein reversibly reallocating use of the second connection comprises:

modifying a configuration a multiplexer operably connected by:

a second connection to the port;
a third connection to the management controller; and
a fourth connection to the processing complex.

18. The data processing system of claim 17, wherein making the second determination comprises:

device link training at least one of the second connection and the third connection to establish an operable connection between the management controller and the device; and using a data structure available on the device to make the second determination.

19. The data processing system of claim 18, wherein performing the action set comprises:

obtaining a data structure from the device; and
reversibly reallocating use of the second connection to the processing complex.

20. The data processing system of claim 16, wherein the operation further comprise:

prior to making the first determination, disabling a switch positioned between the port and the processing complex to cut off communication between the device and the processing complex.

* * * * *